(12) United States Patent
Yamazaki et al.

(10) Patent No.: US 7,698,473 B2
(45) Date of Patent: Apr. 13, 2010

(54) METHODS AND APPARATUS FOR LIST TRANSFERS USING DMA TRANSFERS IN A MULTI-PROCESSOR SYSTEM

(75) Inventors: Takeshi Yamazaki, Kanagawa (JP);
Tsutomu Horikawa, Kanagawa (JP);
James Allan Kahle, Austin, TX (US);
Charles Ray Johns, Austin, TX (US);
Michael Norman Day, Round Rock, TX (US); Peichun Peter Liu, Austin, TX (US)

(73) Assignee: Sony Computer Entertainment Inc., Tokyo (JP)

( * ) Notice: Subject to any disclaimer, the term of this patent is extended or adjusted under 35 U.S.C. 154(b) by 318 days.

(21) Appl. No.: 11/029,891

(22) Filed: Jan. 5, 2005

(65) Prior Publication Data

US 2006/0149861 A1 Jul. 6, 2006

(51) Int. Cl.
*G06F 13/28* (2006.01)
*G06F 15/167* (2006.01)

(52) U.S. Cl. .......................... 710/22; 710/28; 709/212; 711/147

(58) Field of Classification Search .................... 710/22
See application file for complete search history.

(56) References Cited

U.S. PATENT DOCUMENTS

| 5,617,537 | A | * | 4/1997 | Yamada et al. | 709/214 |
| 5,634,099 | A | * | 5/1997 | Andrews et al. | 709/212 |
| 5,644,784 | A | * | 7/1997 | Peek | 710/24 |
| 6,119,176 | A | * | 9/2000 | Maruyama | 710/25 |
| 6,128,674 | A | * | 10/2000 | Beukema et al. | 710/23 |
| 6,526,491 | B2 | | 2/2003 | Suzuoki et al. | |
| 6,529,968 | B1 | * | 3/2003 | Anderson | 710/22 |
| 6,779,049 | B2 | * | 8/2004 | Altman et al. | 710/22 |
| 6,782,465 | B1 | * | 8/2004 | Schmidt | 711/208 |
| 6,804,741 | B2 | * | 10/2004 | Cowan | 710/311 |
| 7,380,027 | B2 | * | 5/2008 | Takashima et al. | 710/22 |
| 2004/0249995 | A1 | * | 12/2004 | Day et al. | 710/22 |

FOREIGN PATENT DOCUMENTS

| EP | 0 758 824 A | 2/1997 |
| EP | 1 209 573 A | 5/2002 |
| JP | 01293431 A | 11/1989 |
| JP | 07036820 A | 2/1995 |

(Continued)

OTHER PUBLICATIONS

International Search Report and Written Opinion for PCT/JP2006/300237, Date of ISR completion: Aug. 8, 2006.*

(Continued)

*Primary Examiner*—Henry W. H. Tsai
*Assistant Examiner*—Michael Sun
(74) *Attorney, Agent, or Firm*—Matthew B. Dernier, Esq.; Gibson & Dernier LLP

(57) ABSTRACT

Methods and apparatus provide for transferring a plurality of data blocks between a shared memory and a local memory of a processor in response to a single DMA command issued by the processor to a direct memory access controller (DMAC), wherein the processor is capable of operative communication with the shared memory and the DMAC is operatively coupled to the local memory.

25 Claims, 7 Drawing Sheets

FOREIGN PATENT DOCUMENTS

| | | |
|---|---|---|
| JP | 10091571 A | 4/1998 |
| JP | 10177541 A | 6/1998 |
| JP | 2002163239 A | 6/2002 |
| JP | 2003208412 A | 7/2003 |

OTHER PUBLICATIONS

Japanese Office Action for corresponding Japanese Patent application No. 2006-000923, Dec. 2, 2008.
Notification of Reason(s) for Refusal Japanese Patent Application 2006-000923, dated Aug. 12, 2008.

* cited by examiner

METHODS AND APPARATUS FOR LIST TRANSFERS USING DMA TRANSFERS IN A MULTI-PROCESSOR SYSTEM

BACKGROUND

The present invention relates to methods and apparatus for transferring data within a multi-processing system.

Real-time, multimedia applications are becoming increasingly important. These applications require extremely fast processing speeds, such as many thousands of megabits of data per second. While some processing systems employ a single processor to achieve fast processing speeds, others are implemented utilizing multi-processor architectures. In multi-processor systems, a plurality of sub-processors can operate in parallel (or at least in concert) to achieve desired processing results.

In recent years, there has been an insatiable desire for faster computer processing data throughputs because cutting-edge computer applications are becoming more and more complex, and are placing ever increasing demands on processing systems. Graphics applications are among those that place the highest demands on a processing system because they require such vast numbers of data accesses, data computations, and data manipulations in relatively short periods of time to achieve desirable visual results.

In some processing system, direct memory access (DMA) techniques are employed where the computer architecture allows data to be sent directly between a device and a memory without involving any microprocessor(s) in the data transfer. The architecture usually includes a memory controller that receives data transfer commands from the device(s) of the system to cause the transfer of data. A conventional DMA command may specify a data block size, a starting virtual address within the system memory from/to which data are to be transferred, and a start address of the device to/from which data are to be transferred. Although the conventional DMA technique is capable of increasing processing speeds as compared with non-direct memory access techniques, it has limitations. For example, in some computing applications, such as graphics processing using a multi-processing system, many DMA transfers from one or more sub-processors might be necessary to achieve desirable results. The conventional approach would require a given sub-processor to issue many DMA commands to effect all of the DMA data transfers, which places a burden on the processor and reduces processing power.

SUMMARY OF THE INVENTION

One or more embodiments of the present invention may provide for an improved DMA technique which minimizes the disadvantageous loss of processing power in a processing system resulting from issuing numerous DMA commands.

In accordance with one or more embodiments, an apparatus includes a processor capable of operative communication with a shared memory and including a local memory that is adapted for execution of instructions therein; and a direct memory access controller (DMAC) coupled to the local memory of the processor and operable to facilitate transfer of a plurality of data blocks between the shared memory and the local memory in response to a single DMA command issued by the processor.

The processor is preferably operable to establish a list within the local memory including a plurality of entries, each entry having at least a starting address of a block of data to be transferred and a size of the data block to be transferred. Preferably, the DMA command specifies at least one entry in the list. The DMAC may be operable to use the starting address and the size specified in the at least one entry of the list to identify a corresponding data block for transfer and to transfer such data block between the shared memory and the local memory.

Preferably, entries of the list are linked such that the DMAC is operable to one entry in the list to locate another entry in the list. The entries of the list include at least one of forward and backward pointers to establish links between the entries.

The DMA command may be adapted to specify that the plurality of data blocks are to be copied from the shared memory to the local memory of the processor. The DMA command may also be adapted to specify that the plurality of data blocks are to be copied from discontiguous areas of the shared memory to contiguous areas of the local memory of the processor. Alternatively or in addition, the DMAC may be adapted to respond to the DMA command by copying the plurality of data blocks from discontiguous areas of the shared memory to contiguous areas of the local memory of the processor.

The DMA command may be adapted to specify that the plurality of data blocks are to be copied from the local memory of the processor to the shared memory. The DMA command may be adapted to specify that the plurality of data blocks are to be copied from contiguous areas of the local memory of the processor to discontiguous areas of the shared memory. Alternatively or in addition, the DMAC may be adapted to respond to the DMA command by copying the plurality of data blocks from contiguous areas of the local memory of the processor to discontiguous areas of the shared memory.

In accordance with one or more further embodiments, an apparatus includes: a plurality of parallel processors capable of operative communication with a shared memory, each processor including: a local memory that is adapted for execution of instructions therein, and a direct memory access controller (DMAC) coupled to the local memory of the processor; and a main processor operatively coupled to the processors, capable of being coupled to the shared memory, and operable to manage the plurality of processors. The DMAC of each processor may be operable to facilitate transfer of a plurality of data blocks between the shared memory and the local memory in response to a single DMA command issued by the processor.

In accordance with one or more further embodiments, a method includes transferring a plurality of data blocks between a shared memory and a local memory of a processor in response to a single DMA command issued by the processor to a direct memory access controller (DMAC), wherein the processor is capable of operative communication with the shared memory and the DMAC is operatively coupled to the local memory.

The method preferably further includes establishing a list within the local memory including a plurality of entries, each entry having at least a starting address of a block of data to be transferred and a size of the data block to be transferred. The method may also include: using the starting address and the size specified in the at least one entry of the list to identify a corresponding data block for transfer; and transferring such data block between the shared memory and the local memory.

The method preferably further includes linking the entries of the list such that one entry in the list may be used to locate another entry in the list. The entries of the list may include at least one of forward and backward pointers to establish links between the entries.

In accordance with one or more further embodiments, a storage medium contains a software program, the software program being operable to cause a processor to execute actions including transferring a plurality of data blocks between a shared memory and a local memory of a processor in response to a single DMA command issued by the processor to a direct memory access controller (DMAC), wherein the processor is capable of operative communication with the shared memory and the DMAC is operatively coupled to the local memory.

Other aspects, features, advantages, etc. will become apparent to one skilled in the art when the description of the invention herein is taken in conjunction with the accompanying drawings.

BRIEF DESCRIPTION OF THE DRAWINGS

For the purposes of illustrating the various aspects of the invention, there are shown in the drawings forms that are presently preferred, it being understood, however, that the invention is not limited to the precise arrangements and instrumentalities shown.

DETAILED DESCRIPTION OF THE PRESENT INVENTION

Figure 1:
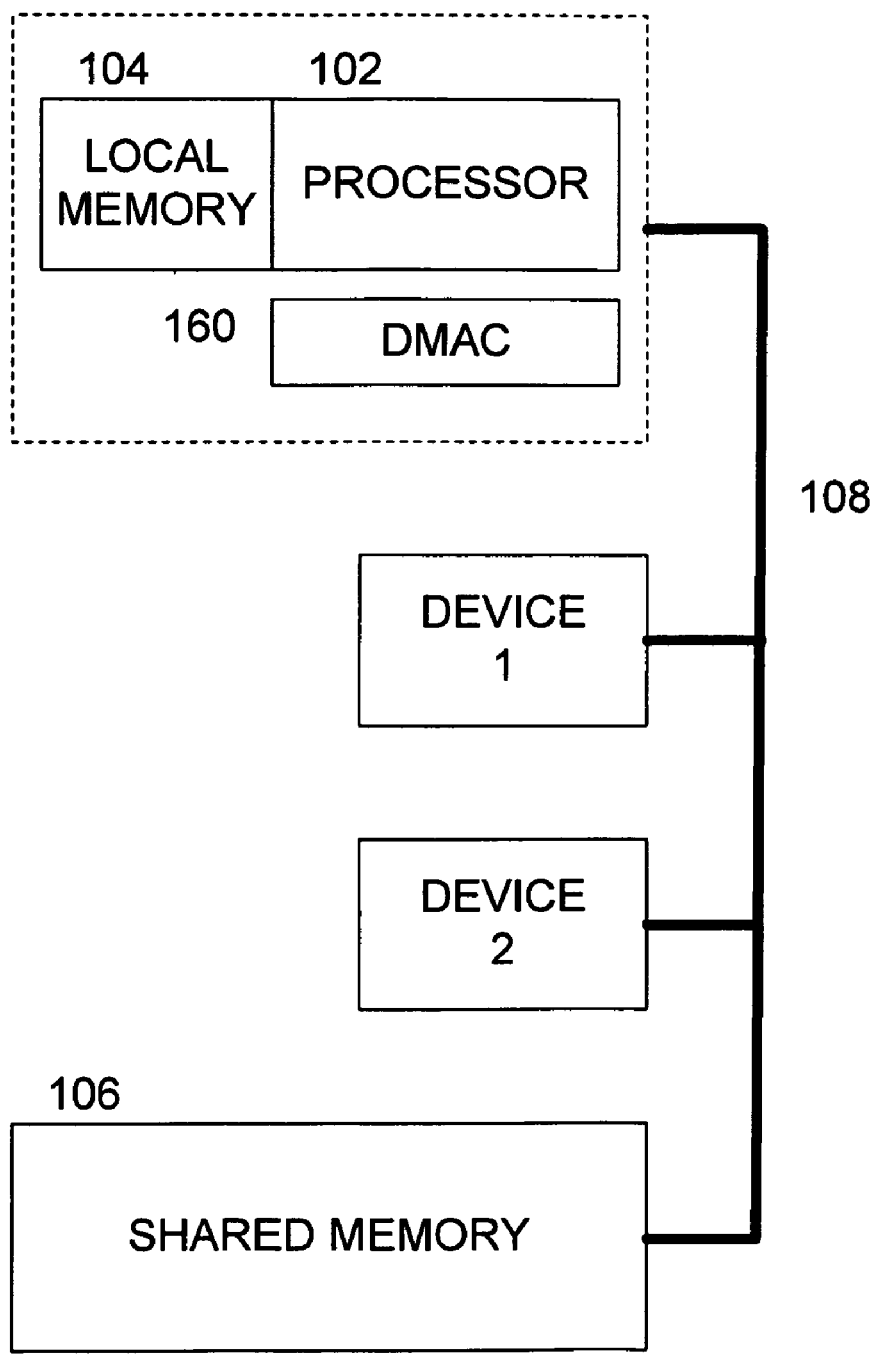
FIG. 1 is a diagram illustrating the structure of a processing system that may be adapted in accordance with one or more aspects of the present invention.

With reference to the drawings, wherein like numerals indicate like elements, there is shown in FIG. 1 a processing system 100 that may be adapted for carrying out one or more features of the present invention. For the purposes of brevity and clarity, the block diagram of FIG. 1 will be referred to and described herein as illustrating an apparatus 100, it being understood, however, that the description may readily be applied to various aspects of a method with equal force.

The apparatus 100 preferably includes a processor 102, a local memory 104, a shared (system or main) memory 106 (e.g., a DRAM), and a bus 108. The system 100 might also include other devices, such as device 1, device 2, etc. that may use the shared memory 106 over the bus 108.

The processor 102 may be implemented utilizing any of the known technologies that are capable of requesting data from the system memory 106, and manipulating the data to achieve a desirable result. For example, the processor 102 may be implemented using any of the known microprocessors that are capable of executing software and/or firmware, including standard microprocessors, distributed microprocessors, etc. By way of example, the processor 102 may be a graphics processor that is capable of requesting and manipulating data, such as pixel data, including gray scale information, color information, texture data, polygonal information, video frame information, etc.

Notably, the local memory 104 is located in the same chip as the processor 102; however, the local memory 104 is preferably not a traditional hardware cache memory in that there are no on chip or off chip hardware cache circuits, cache registers, cache memory controllers, etc. to implement a hardware cache memory function. As on-chip space may be limited, the size of the local memory 104 may be much smaller than the system memory 106. The processor 102 preferably provides data access requests to copy data (which may include program data) from the system memory 106 over the bus 108 into the local memory 104 for program execution and data manipulation. The mechanism for facilitating data access is preferably implemented utilizing a direct memory access controller DMAC 160. The DMAC 160 may be integrally or separately disposed with respect to the processor 102 and/or the local memory 104.

Figure 2:
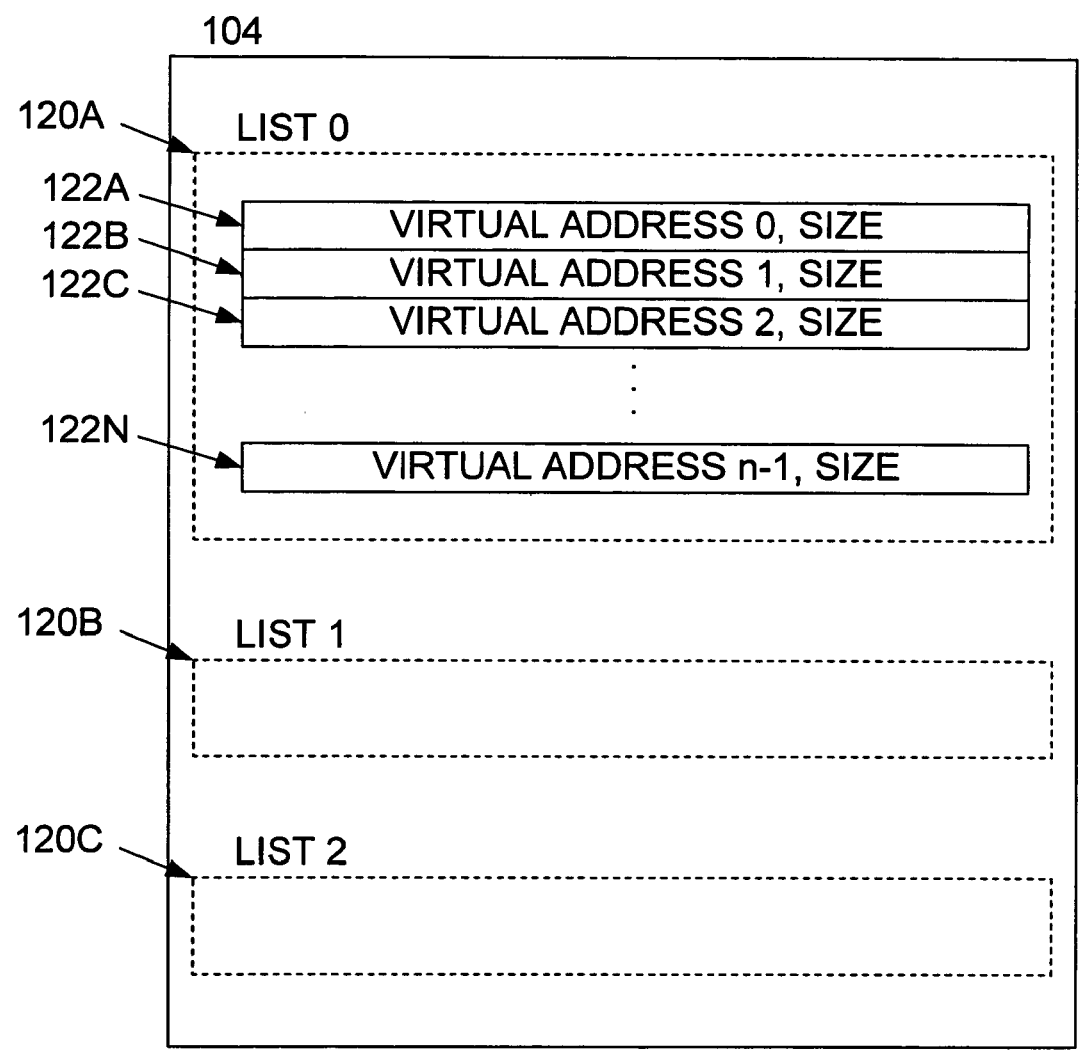
FIG. 2 is a diagram illustrating a direct memory access data block transfer list.
Figure 3:
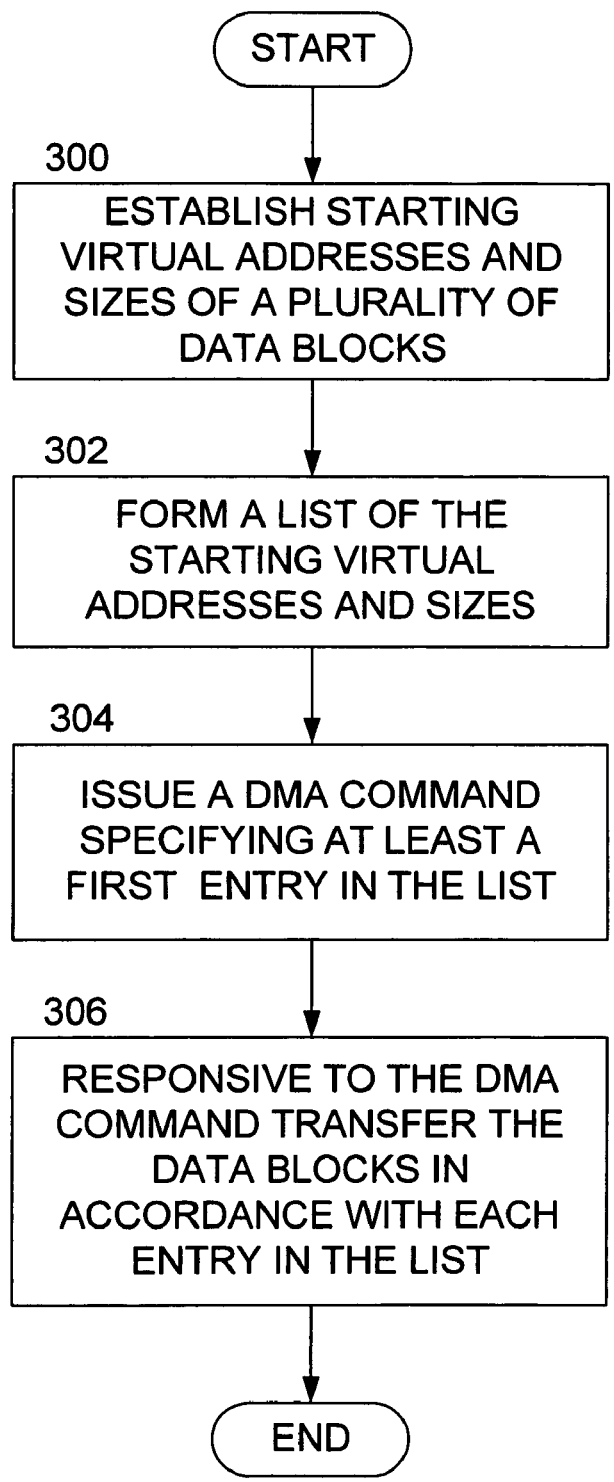
FIG. 3 is a flow diagram illustrating process steps that may be carried out by the processing system of FIG. 1 in accordance with one or more aspects of the present invention.

With reference to FIGS. 1-3, the DMAC 160 is preferably operable to facilitate transfer of a plurality of data blocks between the shared memory 106 and the local memory 104 in response to a single DMA command issued by the processor 102. To this end, the processor 102 is preferably operable to establish at least one list 120 (and possibly a plurality of lists 120A, 120B, 120C, etc.) within the local memory 104, each list including a plurality of entries 122A-N. Each entry 122 preferably includes at least a starting address of a block of data to be transferred and a size of the data block to be transferred. Each starting address and size entry in the list corresponds with or defines a data block within the local memory 104 or the shared memory 106. The address may be a virtual address that requires transformation into a physical address of the shared memory 106.

The DMA command may specify at least one entry, such as entry 122A in the list 120A, such that the issuance of the DMA command (action 304) permits the DMAC 160 to access such entry 122A and begin data block transfers. In response, the DMAC 160 is preferably operable to use the starting address and the size specified in the entry 122A to identify a corresponding data block for transfer and to transfer such data block between the shared memory 106 and the local memory 104 (action 306).

The entries 122 of the list are preferably linked such that the DMAC 160 is operable to use one entry in the list to locate another entry in the list in order to complete transfers of all blocks defined in the list 120. For example, after transferring the data block associated with entry 122A of the list 120A, the DMAC 160 may access further information within the entry 122A to find a next entry 122B in the list 120A. By way of example, each entry 122 of the list 120 may include a forward pointer to establish the link with another entry 122 in the list 120. Thus, for the purposes of discussion, the first entry 122A in the list 120A may include a pointer to a location in the local memory 104 at which the second entry 122B in the list 120A is located. Similarly, the second entry 122B in the list 120A may include a forward pointer to a third entry 122C in the list 120A. This process may be repeated such that each entry 122 in the list 120 is linked in a way that permits the DMAC 160 to access each entry 122 in the list 120. In alternative embodiments, each entry may include a backward pointer and/or both a forward and a backward pointer to establish the desired linkage between entries 122.

In one or more embodiments, the DMA command may be adapted to specify that the plurality of data blocks are to be copied from the shared memory 106 to the local memory 104 of the processor 102. In a preferred embodiment, the DMA command is adapted to specify that the plurality of the data blocks are to be copied from discontiguous areas of the shared memory 160 to contiguous areas of the local memory 104 of the processor 102. In one or more further embodiments, the DMAC 160 might not require reliance on the DMA command itself to respond by copying from discontiguous areas of the shared memory 106 to contiguous areas of the local memory 104.

Preferably, the DMA command is adapted to specify that the plurality of data blocks are to be copied from the local memory 104 of the processor 102 to the shared memory 106. The DMA command may be adapted to specify that such transfer is to be carried out from contiguous areas of the local memory 104 to discontiguous areas of the shared memory 106. In one or more further embodiments, the DMAC 160 may not require reliance on the DMA command to carry out the transfer from contiguous areas of the local memory 104 to discontiguous areas of the shared memory 106.

Figure 4:
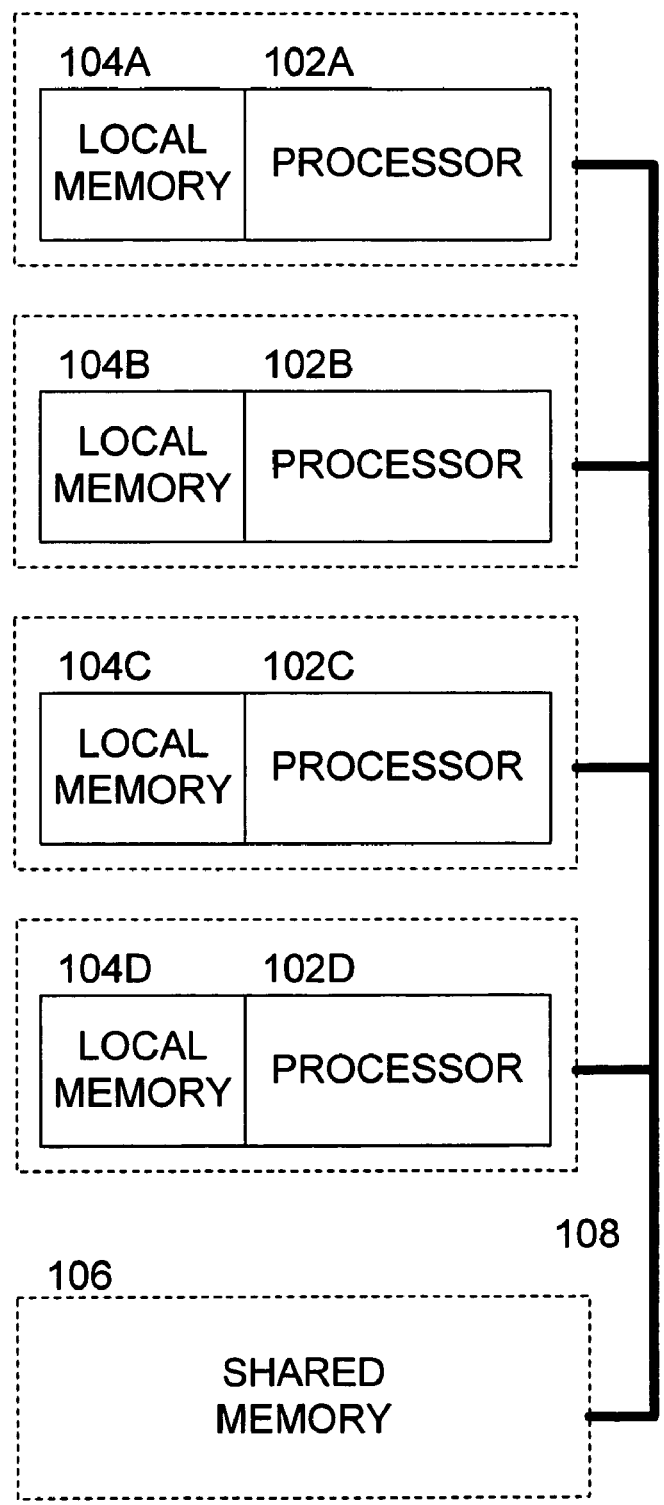
FIG. 4 is a diagram illustrating the structure of a multi-processing system having two or more sub-processors that may be adapted in accordance with one or more aspects of the present invention.

FIG. 4 illustrates a multi-processing system 100A that is adapted to implement one or more further embodiments of the present invention. The system 100A includes a plurality of processors 102A-D, associated local memories 104A-D, and a shared memory 106 interconnected by way of a bus 108. The shared memory 106 may also be referred to herein as a main memory or system memory. Although four processors 102 are illustrated by way of example, any number may be utilized without departing from the spirit and scope of the present invention. Each of the processors 102 may be of similar construction or of differing construction.

The local memories 104 are preferably located on the same chip (same semiconductor substrate) as their respective processors 102; however, the local memories 104 are preferably not traditional hardware cache memories in that there are no on-chip or off-chip hardware cache circuits, cache registers, cache memory controllers, etc. to implement a hardware cache memory function.

The processors 102 preferably provide data access requests to copy data (which may include program data) from the system memory 106 over the bus 108 into their respective local memories 104 for program execution and data manipulation. The mechanism for facilitating data access is preferably implemented utilizing a direct memory access controller (DMAC), not shown. The DMAC of each processor is preferably of substantially the same capabilities as discussed hereinabove with respect to other features of the invention.

The system memory 106 is preferably a dynamic random access memory (DRAM) coupled to the processors 102 through a high bandwidth memory connection (not shown). Although the system memory 106 is preferably a DRAM, the memory 106 may be implemented using other means, e.g., a static random access memory (SRAM), a magnetic random access memory (MRAM), an optical memory, a holographic memory, etc.

Each processor 102 is preferably implemented using a processing pipeline, in which logic instructions are processed in a pipelined fashion. Although the pipeline may be divided into any number of stages at which instructions are processed, the pipeline generally comprises fetching one or more instructions, decoding the instructions, checking for dependencies among the instructions, issuing the instructions, and executing the instructions. In this regard, the processors 102 may include an instruction buffer, instruction decode circuitry, dependency check circuitry, instruction issue circuitry, and execution stages.

The DMACs of the processors 120 are preferably operable to facilitate the transfer of a plurality of data blocks between the shared memory 106 and one or more of the local memories 104 in response to a single DMA command issued by one of the processors 102. To this end, the processors 102, local memories 104, DMACs, etc. preferably include substantially the same functionality as discussed above with respect to FIGS. 1-3. For example, each processor may be operable to establish one or more lists 120 within its local memory 104, the DMA command may specify at least one entry, such as entry 122A in the list 120A, and the DMAC may access such entry 122A and begin data block transfers by using the starting address and the size specified in the entry 122A to identify a corresponding data block for transfer.

Again, the plurality of data blocks may be copied from the shared memory 106 to one or more local memories 104 of the processors 102, or the plurality of data blocks may be copied from one or more local memories 104 of the processors 102 to the shared memory 106. Such block transfers may be copied from discontiguous areas of the shared memory 160 to contiguous areas of the local memory 104 of the processor 102. Alternatively, such transfers may be copied from contiguous areas of the local memory 104 to discontiguous areas of the shared memory 106.

In one or more embodiments, the processors 102, the local memories 104, and the DMACs 160 may be disposed on a common semiconductor substrate. In one or more further embodiments, the shared memory 106 may also be disposed on the common semiconductor substrate or it may be separately disposed.

In one or more alternative embodiments, one or more of the processors 102 may operate as a main processor operatively coupled to the other processors 102 and capable of being coupled to the shared memory 106 over the bus 108. The main processor may schedule and orchestrate the processing of data by the other processors 102. Unlike the other processors 102, however, the main processor may be coupled to a hardware cache memory, which is operable cache data obtained from at least one of the shared memory 106 and one or more of the local memories 104 of the processors 102. The main processor may provide data access requests to copy data (which may include program data) from the system memory 106 over the bus 108 into the cache memory for program execution and data manipulation utilizing any of the known techniques, such as DMA techniques.

A description of a preferred computer architecture for a multi-processor system will now be provided that is suitable for carrying out one or more of the features discussed herein. In accordance with one or more embodiments, the multi-processor system may be implemented as a single-chip solution operable for stand-alone and/or distributed processing of media-rich applications, such as game systems, home terminals, PC systems, server systems and workstations. In some applications, such as game systems and home terminals, real-time computing may be a necessity. For example, in a real-time, distributed gaming application, one or more of networking image decompression, 3D computer graphics, audio generation, network communications, physical simulation, and artificial intelligence processes have to be executed quickly enough to provide the user with the illusion of a real-time experience. Thus, each processor in the multi-processor system must complete tasks in a short and predictable time.

To this end, and in accordance with this computer architecture, all processors of a multi-processing computer system are constructed from a common computing module (or cell). This common computing module has a consistent structure and preferably employs the same instruction set architecture. The multi-processing computer system can be formed of one or more clients, servers, PCs, mobile computers, game machines, PDAs, set top boxes, appliances, digital televisions and other devices using computer processors.

A plurality of the computer systems may also be members of a network if desired. The consistent modular structure enables efficient, high speed processing of applications and data by the multi-processing computer system, and if a network is employed, the rapid transmission of applications and data over the network. This structure also simplifies the building of members of the network of various sizes and processing power and the preparation of applications for processing by these members.

Figure 5:
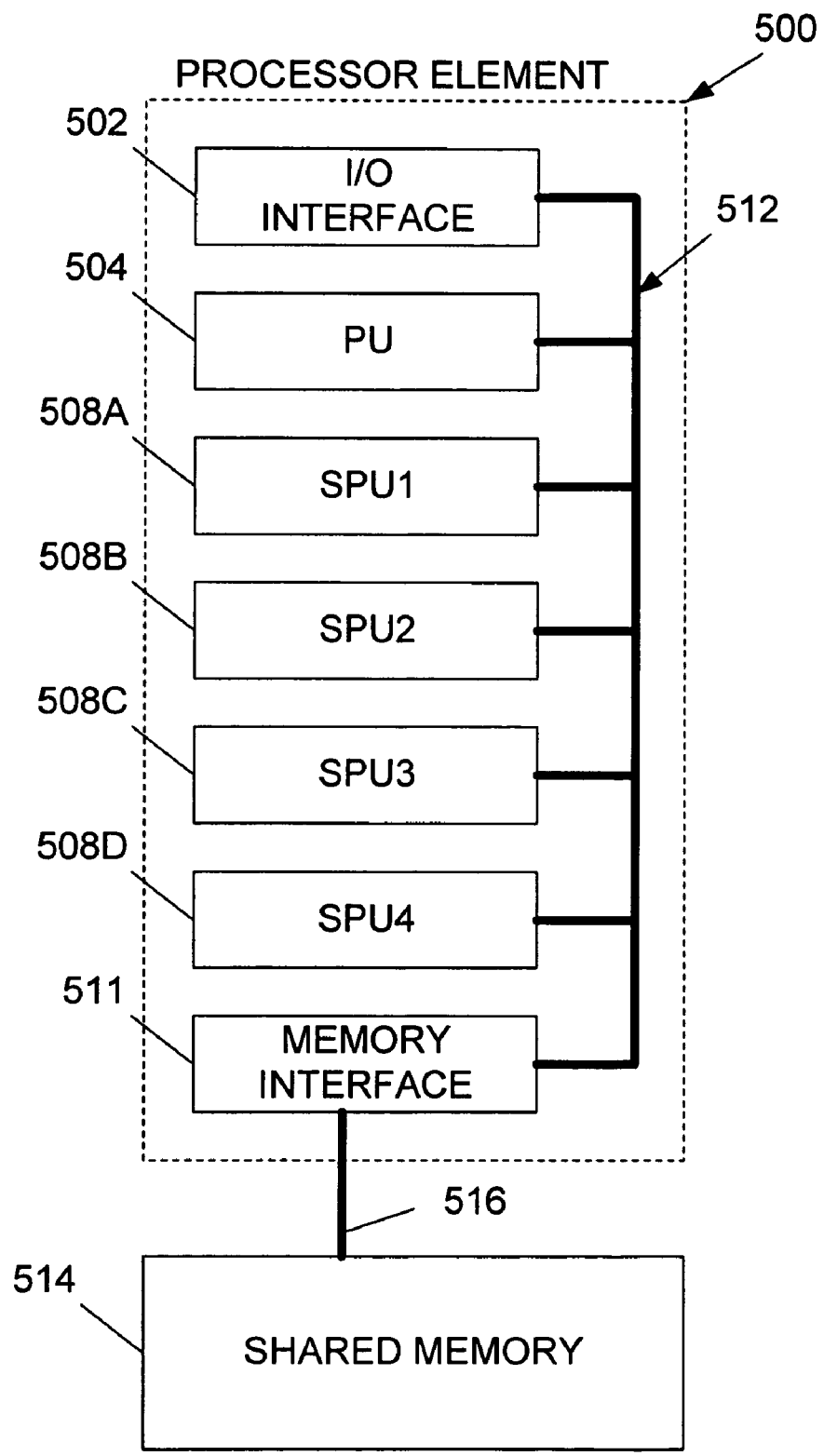
FIG. 5 is a diagram illustrating a preferred processor element (PE) that may be used to implement one or more further aspects of the present invention.

With reference to FIG. 5, the basic processing module is a processor element (PE) 500. The PE 500 comprises an I/O interface 502, a processing unit (PU) 504, and a plurality of sub-processing units 508, namely, sub-processing unit 508A, sub-processing unit 508B, sub-processing unit 508C, and sub-processing unit 508D. A local (or internal) PE bus 512 transmits data and applications among the PU 504, the sub-processing units 508, and a memory interface 511. The local PE bus 512 can have, e.g., a conventional architecture or can be implemented as a packet-switched network. If implemented as a packet switch network, while requiring more hardware, increases the available bandwidth.

The PE 500 can be constructed using various methods for implementing digital logic. The PE 500 preferably is constructed, however, as a single integrated circuit employing a complementary metal oxide semiconductor (CMOS) on a silicon substrate. Alternative materials for substrates include gallium arsinide, gallium aluminum arsinide and other so-called III-B compounds employing a wide variety of dopants. The PE 500 also may be implemented using superconducting material, e.g., rapid single-flux-quantum (RSFQ) logic.

The PE 500 is closely associated with a shared (main) memory 514 through a high bandwidth memory connection 516. Although the memory 514 preferably is a dynamic random access memory (DRAM), the memory 514 could be implemented using other means, e.g., as a static random access memory (SRAM), a magnetic random access memory (MRAM), an optical memory, a holographic memory, etc.

The PU 504 and the sub-processing units 508 are preferably each coupled to a memory flow controller (MFC) including direct memory access DMA functionality, which in combination with the memory interface 511, facilitate the transfer of data between the DRAM 514 and the sub-processing units 508 and the PU 504 of the PE 500. It is noted that the DMAC and/or the memory interface 511 may be integrally or separately disposed with respect to the sub-processing units 508 and the PU 504. Indeed, the DMAC function and/or the memory interface 511 function may be integral with one or more (preferably all) of the sub-processing units 508 and the PU 504. It is also noted that the DRAM 514 may be integrally or separately disposed with respect to the PE 500. For example, the DRAM 514 may be disposed off-chip as is implied by the illustration shown or the DRAM 514 may be disposed on-chip in an integrated fashion.

The PU 504 can be, e.g., a standard processor capable of stand-alone processing of data and applications. In operation, the PU 504 preferably schedules and orchestrates the processing of data and applications by the sub-processing units. The sub-processing units preferably are single instruction, multiple data (SIMD) processors. Under the control of the PU 504, the sub-processing units perform the processing of these data and applications in a parallel and independent manner. The PU 504 is preferably implemented using a PowerPC core, which is a microprocessor architecture that employs reduced instruction-set computing (RISC) technique. RISC performs more complex instructions using combinations of simple instructions. Thus, the timing for the processor may be based on simpler and faster operations, enabling the microprocessor to perform more instructions for a given clock speed.

It is noted that the PU 504 may be implemented by one of the sub-processing units 508 taking on the role of a main processing unit that schedules and orchestrates the processing of data and applications by the sub-processing units 508. Further, there may be more than one PU implemented within the processor element 500.

In accordance with this modular structure, the number of PEs 500 employed by a particular computer system is based upon the processing power required by that system. For example, a server may employ four PEs 500, a workstation may employ two PEs 500 and a PDA may employ one PE 500. The number of sub-processing units of a PE 500 assigned to processing a particular software cell depends upon the complexity and magnitude of the programs and data within the cell.

Figure 6:
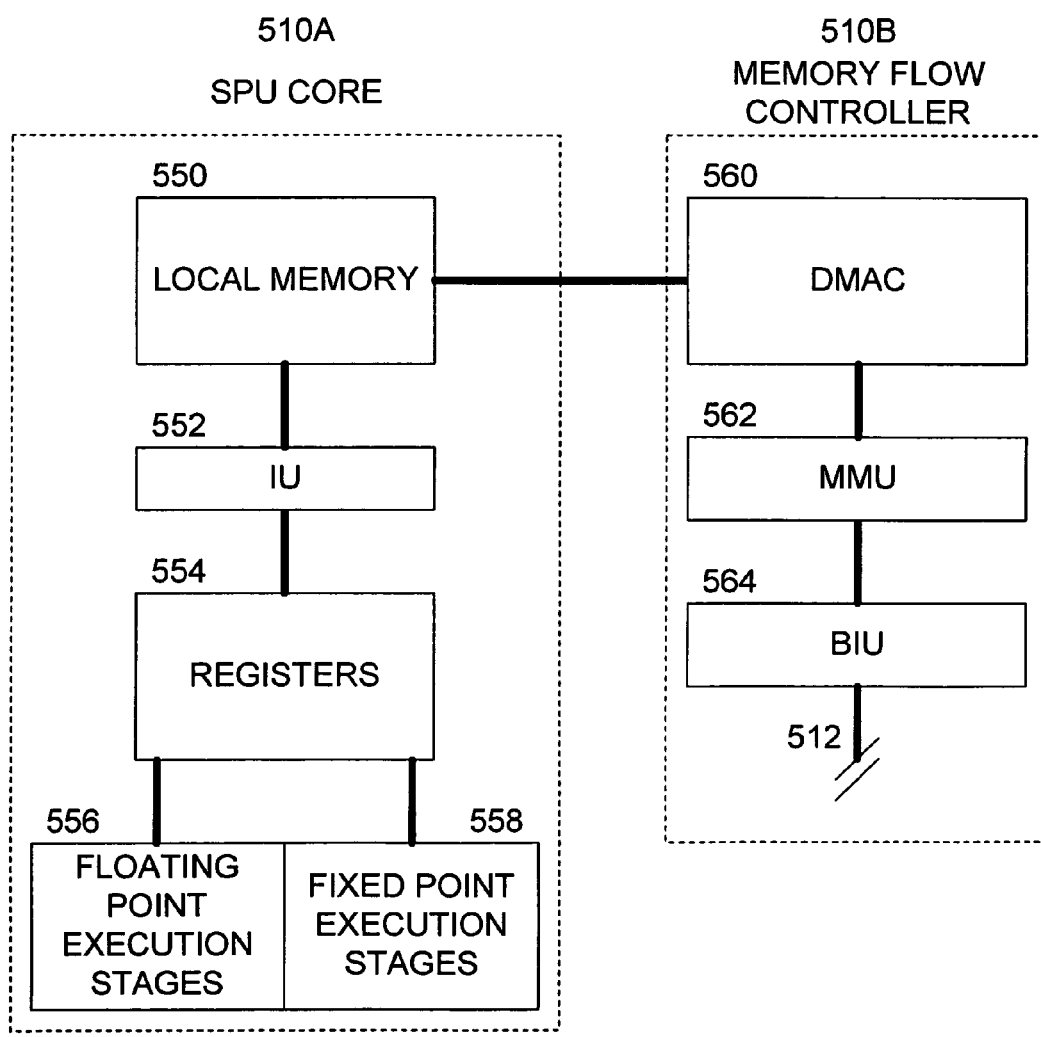
FIG. 6 is a diagram illustrating the structure of an exemplary sub-processing unit (SPU) of the system of FIG. 5 that may be adapted in accordance with one or more further aspects of the present invention.

FIG. 6 illustrates the preferred structure and function of a sub-processing unit (SPU) 508. The SPU 508 architecture preferably fills a void between general-purpose processors (which are designed to achieve high average performance on a broad set of applications) and special-purpose processors (which are designed to achieve high performance on a single application). The SPU 508 is designed to achieve high performance on game applications, media applications, broadband systems, etc., and to provide a high degree of control to programmers of real-time applications. Some capabilities of the SPU 508 include graphics geometry pipelines, surface subdivision, Fast Fourier Transforms, image processing keywords, stream processing, MPEG encoding/decoding, encryption, decryption, device driver extensions, modeling, game physics, content creation, and audio synthesis and processing.

The sub-processing unit 508 includes two basic functional units, namely an SPU core 510A and a memory flow controller (MFC) 510B. The SPU core 510A performs program execution, data manipulation, etc., while the MFC 510B performs functions related to data transfers between the SPU core 510A and the DRAM 514 of the system.

The SPU core 510A includes a local memory 550, an instruction unit (IU) 552, registers 554, one or more floating point execution stages 556 and one or more fixed point execution stages 558. The local memory 550 is preferably implemented using single-ported random access memory, such as an SRAM. Whereas most processors reduce latency to memory by employing caches, the SPU core 510A implements the relatively small local memory 550 rather than a cache. Indeed, in order to provide consistent and predictable memory access latency for programmers of real-time applications (and other applications as mentioned herein) a cache memory architecture within the SPU 508A is not preferred. The cache hit/miss characteristics of a cache memory results in volatile memory access times, varying from a few cycles to a few hundred cycles. Such volatility undercuts the access timing predictability that is desirable in, for example, real-time application programming. Latency hiding may be achieved in the local memory SRAM 550 by overlapping DMA transfers with data computation. This provides a high degree of control for the programming of real-time applications. As the latency and instruction overhead associated with DMA transfers exceeds that of the latency of servicing a cache miss, the SRAM local memory approach achieves an advantage when the DMA transfer size is sufficiently large and is sufficiently predictable (e.g., a DMA command can be issued before data is needed).

A program running on a given one of the sub-processing units 508 references the associated local memory 550 using a local address, however, each location of the local memory 550 is also assigned a real address (RA) within the overall system's memory map. This allows Privilege Software to map a local memory 550 into the Effective Address (EA) of a process to facilitate DMA transfers between one local memory 550 and another local memory 550. The PU 504 can also directly access the local memory 550 using an effective address. In a preferred embodiment, the local memory 550 contains 556 kilobytes of storage, and the capacity of registers 552 is 128×128 bits.

The SPU core 504A is preferably implemented using a processing pipeline, in which logic instructions are processed in a pipelined fashion. Although the pipeline may be divided into any number of stages at which instructions are processed, the pipeline generally comprises fetching one or more instructions, decoding the instructions, checking for dependencies among the instructions, issuing the instructions, and executing the instructions. In this regard, the IU 552 includes an instruction buffer, instruction decode circuitry, dependency check circuitry, and instruction issue circuitry.

The instruction buffer preferably includes a plurality of registers that are coupled to the local memory 550 and operable to temporarily store instructions as they are fetched. The instruction buffer preferably operates such that all the instructions leave the registers as a group, i.e., substantially simultaneously. Although the instruction buffer may be of any size, it is preferred that it is of a size not larger than about two or three registers.

In general, the decode circuitry breaks down the instructions and generates logical micro-operations that perform the function of the corresponding instruction. For example, the logical micro-operations may specify arithmetic and logical operations, load and store operations to the local memory 550, register source operands and/or immediate data operands. The decode circuitry may also indicate which resources the instruction uses, such as target register addresses, structural resources, function units and/or busses. The decode circuitry may also supply information indicating the instruction pipeline stages in which the resources are required. The instruction decode circuitry is preferably operable to substantially simultaneously decode a number of instructions equal to the number of registers of the instruction buffer.

The dependency check circuitry includes digital logic that performs testing to determine whether the operands of given instruction are dependent on the operands of other instructions in the pipeline. If so, then the given instruction should not be executed until such other operands are updated (e.g., by permitting the other instructions to complete execution). It is preferred that the dependency check circuitry determines dependencies of multiple instructions dispatched from the decoder circuitry 112 simultaneously.

The instruction issue circuitry is operable to issue the instructions to the floating point execution stages 556 and/or the fixed point execution stages 558.

The registers 554 are preferably implemented as a relatively large unified register file, such as a 128-entry register file. This allows for deeply pipelined high-frequency implementations without requiring register renaming to avoid register starvation. Renaming hardware typically consumes a significant fraction of the area and power in a processing system. Consequently, advantageous operation may be achieved when latencies are covered by software loop unrolling or other interleaving techniques.

Preferably, the SPU core 510A is of a superscalar architecture, such that more than one instruction is issued per clock cycle. The SPU core 510A preferably operates as a superscalar to a degree corresponding to the number of simultaneous instruction dispatches from the instruction buffer, such as between 2 and 3 (meaning that two or three instructions are issued each clock cycle). Depending upon the required processing power, a greater or lesser number of floating point execution stages 556 and fixed point execution stages 558 may be employed. In a preferred embodiment, the floating point execution stages 556 operate at a speed of 32 billion floating point operations per second (32 GFLOPS), and the fixed point execution stages 558 operate at a speed of 32 billion operations per second (32 GOPS).

The MFC 510B preferably includes a bus interface unit (BIU) 564, a memory management unit (MMU) 562, and a direct memory access controller (DMAC) 560. With the exception of the DMAC 560, the MFC 510B preferably runs at half frequency (half speed) as compared with the SPU core 510A and the bus 512 to meet low power dissipation design objectives. The MFC 510B is operable to handle data and instructions coming into the SPU 508 from the bus 512, provides address translation for the DMAC, and snoop-operations for data coherency. The BIU 564 provides an interface between the bus 512 and the MMU 562 and DMAC 560. Thus, the SPU 508 (including the SPU core 510A and the MFC 510B) and the DMAC 560 are connected physically and/or logically to the bus 512.

The MMU 562 is preferably operable to translate effective addresses (taken from DMA commands) into real addresses for memory access. For example, the MMU 562 may translate the higher order bits of the effective address into real address bits. The lower-order address bits, however, are preferably untranslatable and are considered both logical and physical for use to form the real address and request access to memory. In one or more embodiments, the MMU 562 may be implemented based on a 64-bit memory management model, and may provide $2^{64}$ bytes of effective address space with 4K-, 64K-, 1M-, and 16M-byte page sizes and 256MB segment sizes. Preferably, the MMU 562 is operable to support up to $2^{65}$ bytes of virtual memory, and $2^{42}$ bytes (4 TeraBytes) of physical memory for DMA commands. The hardware of the MMU 562 may include an 8-entry, fully associative SLB, a 256-entry, 4way set associative TLB, and a 4×4 Replacement Management Table (RMT) for the TLB—used for hardware TLB miss handling.

The DMAC 560 is preferably operable to manage DMA commands from the SPU core 510A and one or more other devices such as the PU 504 and/or the other SPUs. There may be three categories of DMA commands: Put commands, which operate to move data from the local memory 550 to the shared memory 514; Get commands, which operate to move data into the local memory 550 from the shared memory 514; and Storage Control commands, which include SLI commands and synchronization commands. The synchronization commands may include atomic commands, send signal commands, and dedicated barrier commands. In response to DMA commands, the MMU 562 translates the effective address into a real address and the real address is forwarded to the BIU 564.

The SPU core 510A preferably uses a channel interface and data interface to communicate (send DMA commands, status, etc.) with an interface within the DMAC 560. The SPU core 510A dispatches DMA commands through the channel interface to a DMA queue in the DMAC 560. Once a DMA command is in the DMA queue, it is handled by issue and completion logic within the DMAC 560. When all bus transactions for a DMA command are finished, a completion signal is sent back to the SPU core 510A over the channel interface.

Figure 7:
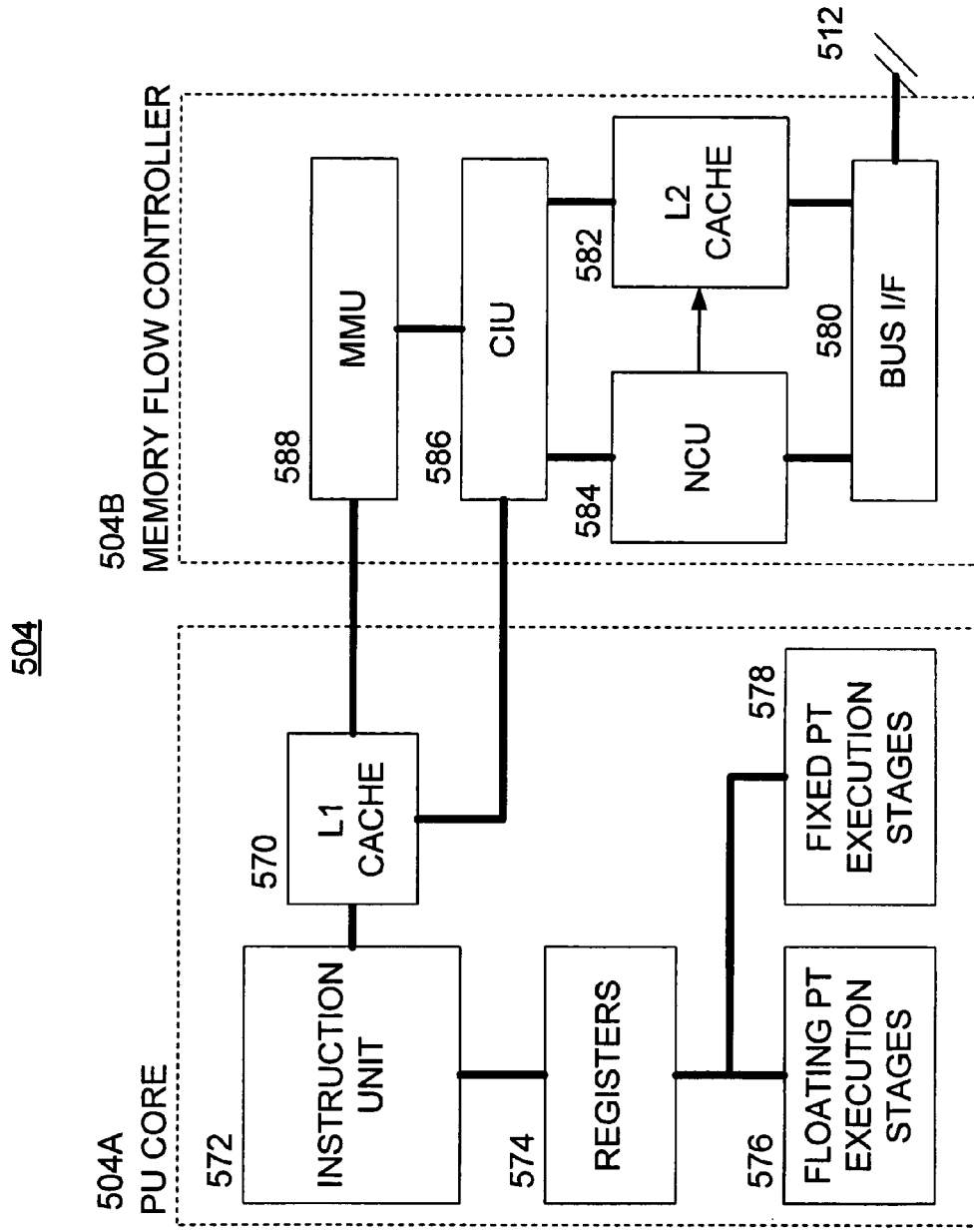
FIG. 7 is a diagram illustrating the structure of an exemplary processing unit (PU) of the system of FIG. 5 that may be adapted in accordance with one or more further aspects of the present invention.

FIG. 7 illustrates the preferred structure and function of the PU 504. The PU 504 includes two basic functional units, the PU core 504A and the memory flow controller (MFC) 504B. The PU core 504A performs program execution, data manipulation, multi-processor management functions, etc., while the MFC 504B performs functions related to data transfers between the PU core 504A and the memory space of the system 100.

The PU core 504A may include an L1 cache 570, an instruction unit 572, registers 574, one or more floating point execution stages 576 and one or more fixed point execution stages 578. The L1 cache provides data caching functionality for data received from the shared memory 106, the processors 102, or other portions of the memory space through the MFC 504B. As the PU core 504A is preferably implemented as a superpipeline, the instruction unit 572 is preferably implemented as an instruction pipeline with many stages, including fetching, decoding, dependency checking, issuing, etc. The PU core 504A is also preferably of a superscalar configuration, whereby more than one instruction is issued from the instruction unit 572 per clock cycle. To achieve a high processing power, the floating point execution stages 576 and the fixed point execution stages 578 include a plurality of stages in a pipeline configuration. Depending upon the required processing power, a greater or lesser number of floating point execution stages 576 and fixed point execution stages 578 may be employed.

The MFC 504B includes a bus interface unit (BIU) 580, an L2 cache memory 582, a non-cachable unit (NCU) 584, a core interface unit (CIU) 586, and a memory management unit (MMU) 588. Most of the MFC 504B runs at half frequency (half speed) as compared with the PU core 504A and the bus 108 to meet low power dissipation design objectives.

The BIU 580 provides an interface between the bus 108 and the L2 cache 582 and NCU 584 logic blocks. To this end, the BIU 580 may act as a Master as well as a Slave device on the bus 108 in order to perform fully coherent memory operations. As a Master device it may source load/store requests to the bus 108 for service on behalf of the L2 cache 582 and the NCU 584. The BIU 580 may also implement a flow control mechanism for commands which limits the total number of commands that can be sent to the bus 108. The data operations on the bus 108 may be designed to take eight beats and, therefore, the BIU 580 is preferably designed around 128 byte cache-lines and the coherency and synchronization granularity is 128 KB.

The L2 cache memory 582 (and supporting hardware logic) is preferably designed to cache 512 KB of data. For example, the L2 cache 582 may handle cacheable loads/stores, data pre-fetches, instruction fetches, instruction pre-fetches, cache operations, and barrier operations. The L2 cache 582 is preferably an 8-way set associative system. The L2 cache 582 may include six reload queues matching six (6) castout queues (e.g., six RC machines), and eight (64-byte wide) store queues. The L2 cache 582 may operate to provide a backup copy of some or all of the data in the L1 cache 570. Advantageously, this is useful in restoring state(s) when processing nodes are hot-swapped. This configuration also permits the L1 cache 570 to operate more quickly with fewer ports, and permits faster cache-to-cache transfers (because the requests may stop at the L2 cache 582). This configuration also provides a mechanism for passing cache coherency management to the L2 cache memory 582.

The NCU 584 interfaces with the CIU 586, the L2 cache memory 582, and the BIU 580 and generally functions as a queueing/buffering circuit for non-cacheable operations between the PU core 504A and the memory system. The NCU 584 preferably handles all communications with the PU core 504A that are not handled by the L2 cache 582, such as cache-inhibited load/stores, barrier operations, and cache coherency operations. The NCU 584 is preferably run at half speed to meet the aforementioned power dissipation objectives.

The CIU 586 is disposed on the boundary of the MFC 504B and the PU core 504A and acts as a routing, arbitration, and flow control point for requests coming from the execution stages 576, 578, the instruction unit 572, and the MMU unit 588 and going to the L2 cache 582 and the NCU 584. The PU core 504A and the MMU 588 preferably run at full speed, while the L2 cache 582 and the NCU 584 are operable for a 2:1 speed ratio. Thus, a frequency boundary exists in the CIU 586 and one of its functions is to properly handle the frequency crossing as it forwards requests and reloads data between the two frequency domains.

The CIU 586 is comprised of three functional blocks: a load unit, a store unit, and reload unit. In addition, a data pre-fetch function is performed by the CIU 586 and is preferably a functional part of the load unit. The CIU 586 is preferably operable to: (i) accept load and store requests from the PU core 504A and the MMU 588; (ii) convert the requests from full speed clock frequency to half speed (a 2:1 clock frequency conversion); (iii) route cachable requests to the L2 cache 582, and route non-cachable requests to the NCU 584; (iv) arbitrate fairly between the requests to the L2 cache 582 and the NCU 584; (v) provide flow control over the dispatch to the L2 cache 582 and the NCU 584 so that the requests are received in a target window and overflow is avoided; (vi) accept load return data and route it to the execution stages 576, 578, the instruction unit 572, or the MMU 588; (vii) pass snoop requests to the execution stages 576, 578, the instruction unit 572, or the MMU 588; and (viii) convert load return data and snoop traffic from half speed to full speed.

The MMU 588 preferably provides address translation for the PU core 540A, such as by way of a second level address translation facility. A first level of translation is preferably provided in the PU core 504A by separate instruction and data ERAT (effective to real address translation) arrays that may be much smaller and faster than the MMU 588.

In a preferred embodiment, the PU 504 operates at 4-6 GHz, 10F04, with a 64-bit implementation. The registers are preferably 64 bits long (although one or more special purpose registers may be smaller) and effective addresses are 64 bits long. The instruction unit 570, registers 572 and execution stages 574 and 576 are preferably implemented using PowerPC technology to achieve the (RISC) computing technique.

Additional details regarding the modular structure of this computer system may be found in U.S. Pat. No. 6,526,491, the entire disclosure of which is hereby incorporated by reference.

In accordance with at least one further aspect of the present invention, the methods and apparatus described above may be achieved utilizing suitable hardware, such as that illustrated in the figures. Such hardware may be implemented utilizing any of the known technologies, such as standard digital circuitry, any of the known processors that are operable to execute software and/or firmware programs, one or more programmable digital devices or systems, such as programmable read only memories (PROMs), programmable array logic devices (PALs), etc. Furthermore, although the apparatus illustrated in the figures are shown as being partitioned into certain functional blocks, such blocks may be implemented by way of separate circuitry and/or combined into one or more functional units. Still further, the various aspects of the invention may be implemented by way of software and/or firmware program(s) that may be stored on suitable storage medium or media (such as floppy disk(s), memory chip(s), etc.) for transportability and/or distribution.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An apparatus, comprising:
a plurality of parallel processors, each capable of operative communication with a shared memory, each processor including a local memory that is adapted for execution of instructions therein, and each processor including a direct memory access controller (DMAC) coupled to the local memory of such processor and each DMAC operating to facilitate transfer of a plurality of data blocks between the shared memory and the local memory of such processor in response to a single, respective DMA command issued by such processor, wherein:
each of the plurality of data blocks includes a respective number of data words, the respective number being equal to a respective, specified data block size,
the single DMA command of a given transfer does not include any specified data block size information for any of the plurality of data blocks,
each processor is operable to establish a list within the local memory thereof including a plurality of entries, each entry being identified by a respective one of the DMA commands, each entry having at least a starting address of a block of data to be transferred and a size of the data block to be transferred in response to such DMA command, and at least some of the entries of the list being linked such that the DMAC is operable to use one entry in the list to locate another entry in the list, and
the DMAC is operable to use the starting address and the size specified in each entry identified by a respective one of the DMA commands to identify a corresponding data block for transfer, and to transfer such data block, between the shared memory and the local memory of the at least one processor.

2. The apparatus of claim 1, wherein the entries of the list include at least one of forward and backward pointers to establish links between the entries.

3. The apparatus of claim 1, wherein the DMA command is adapted to specify that the plurality of data blocks are to be copied from the shared memory to the local memory of a given one of the plurality of processors.

4. The apparatus of claim 3, wherein the DMA command is adapted to specify that the plurality of data blocks are to be copied from discontiguous areas of the shared memory to contiguous areas of the local memory of the given one of the plurality of processors.

5. The apparatus of claim 3, wherein the DMAC is adapted to respond to the DMA command by copying the plurality of data blocks from discontiguous areas of the shared memory to contiguous areas of the local memory of the given one of the plurality of processors.

6. The apparatus of claim 1, wherein the DMA command is adapted to specify that the plurality of data blocks are to be copied from the local memory of the given one of the plurality of processors to the shared memory.

7. The apparatus of claim 6, wherein the DMA command is adapted to specify that the plurality of data blocks are to be copied from contiguous areas of the local memory of the given one of the plurality of processors to discontiguous areas of the shared memory.

8. The apparatus of claim 6, wherein the DMAC is adapted to respond to the DMA command by copying the plurality of data blocks from contiguous areas of the local memory of the given one of the plurality of processors to discontiguous areas of the shared memory.

9. The apparatus of claim 1, wherein the local memory of each of the plurality of processors is not a hardware cache memory.

10. The apparatus of claim 1, further comprising a main processor operatively coupled to the plurality of processors, capable of being coupled to the shared memory, and operable to manage the plurality of processors.

11. The apparatus of claim 1, wherein the processors, the local memories, and the DMACs are disposed on a common semiconductor substrate.

12. The apparatus of claim 1, further comprising the shared memory coupled to the processors over a bus.

13. The apparatus of claim 1, wherein the processors, the associated local memories, the DMACs and the shared memory are disposed on a common semiconductor substrate.

14. An apparatus, comprising:
a plurality of parallel processors capable of operative communication with a shared memory, each processor including: a local memory that is not a hardware cache memory and is adapted for execution of instructions therein, and a direct memory access controller (DMAC) coupled to the local memory of the processor; and
a main processor operatively coupled to the processors, capable of being coupled to the shared memory, and operable to manage the plurality of processors, wherein the DMAC of each processor is operable to facilitate transfer of a plurality of data blocks between the shared memory and the respective local memory of each such processor in response to a single DMA command issued by each such processor,
each of the plurality of data blocks includes a respective number of data words, the respective number being equal to a respective, specified data block size,
the single DMA command of a given transfer does not include any specified data block size information for any of the plurality of data blocks,
each processor is operable to establish a list within the local memory thereof including a plurality of entries, each entry being identified by a respective one of the DMA commands, each entry having at least a starting address of a block of data to be transferred and a size of the data block to be transferred in response to such DMA command, and at least some of the entries of the list being linked such that the DMAC is operable to use one entry in the list to locate another entry in the list, and
the DMAC is operable to use the starting address and the size specified in each entry identified by a respective one of the DMA commands to identify a corresponding data block for transfer, and to transfer such data block, between the shared memory and the local memory of the at least one processor.

15. The apparatus of claim 14, further comprising a hardware cache memory associated with the main processor and operable cache data obtained from at least one of the shared memory and one or more of the local memories of the processors.

16. The apparatus of claim 14, wherein the local memory of each of the plurality of processors is not a hardware cache memory.

17. A method, comprising:
    establishing a list within a local memory of a given one of a plurality of processors, each list including a plurality of entries, each entry being identified by a respective DMA command, each entry having at least a starting address of a block of data to be transferred and a size of the data block to be transferred in response to such DMA command, and at least some of the entries of the list being linked; and
    transferring a plurality of data blocks between a shared memory and a local memory of a given one of a plurality of parallel processors in response to a single DMA command issued by the given processor to a direct memory access controller (DMAC) of such processor, each of the plurality of data blocks including a respective number of data words, the respective number being equal to a respective, specified data block size, the single DMA command of a given transfer does not include any specified data block size information for any of the plurality of data blocks, the DMAC using the staffing address and the size specified in the entry identified by such single DMA command, and if linked using the staffing addresses and the sizes specified by such linked entries, to identify corresponding data blocks for the transfer, and to transfer such data blocks, between the shared memory and the local memory of the given processor.

18. The method of claim 17, wherein the entries of the list include at least one of forward and backward pointers to establish links between the entries.

19. The method of claim 17, wherein the DMA command is adapted to specify that the plurality of data blocks are to be copied from the shared memory to one of the local memories of the processors.

20. The method of claim 17, further comprising copying the plurality of data blocks from discontiguous areas of the shared memory to contiguous areas of one of the local memories of the processors.

21. The method of claim 17, wherein the DMA command is adapted to specify that the plurality of data blocks are to be copied from the local memory of the given processor to the shared memory thereof.

22. The method of claim 17, further comprising copying the plurality of data blocks from contiguous areas of one of the local memories of the processors to discontiguous areas of the shared memory.

23. A storage medium containing a software program, the software program being operable to cause a processor to execute actions including:
    establishing a list within a local memory of a given one of a plurality of processors, each list including a plurality of entries, each entry being identified by a respective DMA command, each entry having at least a staffing address of a block of data to be transferred and a size of the data block to be transferred in response to such DMA command, and at least some of the entries of the list being linked; and
    transferring a plurality of data blocks between a shared memory and a local memory of a given one of a plurality of parallel processors in response to a single DMA command issued by the given processor to a direct memory access controller (DMAC) thereof, each of the plurality of data blocks including a respective number of data words, the respective number being equal to a respective, specified data block size, the single DMA command of a given transfer does not include any specified data block size information for any of the plurality of data blocks, the DMAC using the starting address and the size specified in the entry identified by such single DMA command, and if linked using the staffing addresses and the sizes specified by such linked entries, to identify corresponding data blocks for the transfer, and to transfer such data blocks, between the shared memory and the local memory of the given processor.

24. The storage medium of claim 23, further comprising copying the plurality of data blocks from discontiguous areas of the shared memory to contiguous areas of one of the local memories of the processors.

25. The storage medium of claim 23, further comprising copying the plurality of data blocks from contiguous areas of one of the local memories of the processors to discontiguous areas of the shared memory.

* * * * *